Fig. 1

| Material | Range of Percentages |
|---|---|
| Lead Oxide (PbO) | 70 - 90 |
| Boron Oxide ($B_2O_3$) (Can be substituted by: $As_2O_3$ or $As_2O_5$ and $Bi_2O_3$ at any ratio) | 8 - 15 |
| Silicon Dioxide ($SiO_2$) | 3 - 5 |
| Aluminum Oxide ($Al_2O_3$) | $0^+$ - 0.4 |

Fig. 2

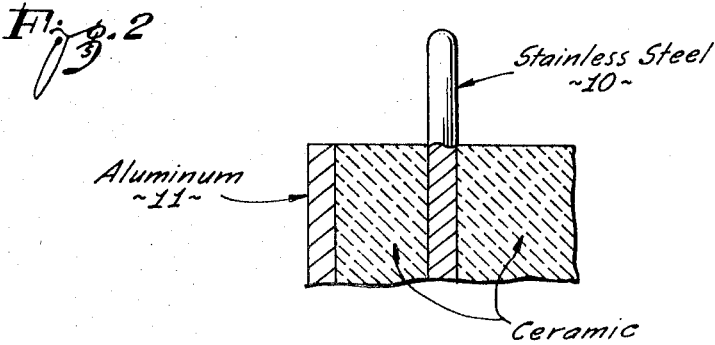

Stainless Steel ~10~
Aluminum ~11~
Ceramic

Fig. 3

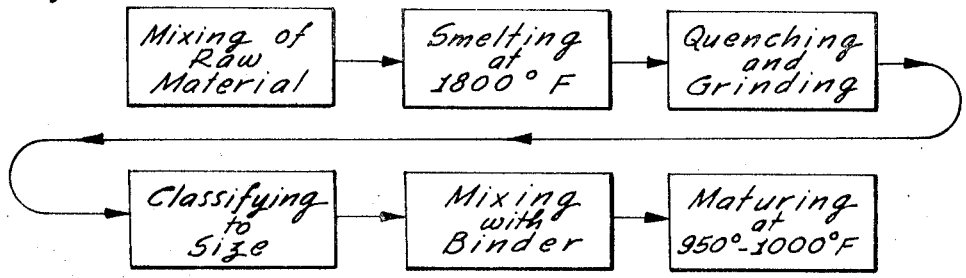

Mixing of Raw Material → Smelting at 1800° F → Quenching and Grinding → Classifying to Size → Mixing with Binder → Maturing at 950°-1000°F INVENTOR:
John A. Earl By Smyth, Rooton & Pavitt
Attorneys United States Patent Office 3,455,708
Patented July 15, 1969

3,455,708
CERAMIC MATERIAL
John A. Earl, Alhambra, Calif., assignor to Physical Sciences Corporation, Arcadia, Calif., a corporation of California
Filed Mar. 18, 1964, Ser. No. 352,731
Int. Cl. C03c 3/10, 3/04
U.S. Cl. 106—53       3 Claims

ABSTRACT OF THE DISCLOSURE

This invention relates to a ceramic material which is bonded to a first surface of an element such as stainless steel and to a second surface of an element such as aluminum. The ceramic material has properties of providing an electrical insulation of high value through a range of temperatures to approximately 800° F. and of providing a hermetic seal through a range of temperatures to approximately 800° F. The ceramic material consists of lead oxide in a range of approximately 70% to 90%, boron oxide in a range of approximately 8% to 15%, silicon dioxide in a range of approximately 3% to 5% and aluminum oxide in a range up to approximately 0.4%. The invention also relates to methods of producing such ceramic material.

---

This invention relates to a ceramic material having properties of providing electrical insulation and a hermetic seal over an extended range of temperatures. It is a primary object of the present invention to provide a bond and hermetic seal between certain metals such as stainless steel and aluminum.

A considerable effort has been made in recent years to provide a ceramic material which will be bonded to metals such as stainless steel as well as aluminum, and which will provide electrical insulation and a hermetic seal over an extended range of temperatures. Such efforts have not been entirely successful, especially when the range of temperatures has extended as high at 1000° F. The electrical insulation of the ceramic material has tended to decrease considerably at such elevated temperatures, and the hermetic seal has been broken.

The invention will be explained more fully below and with particular reference to the drawings, in which FIGURE 1 is a table showing the ranges of the materials used; FIGURE 2 is a cross section of a novel bond between the stainless steel pin and an aluminum shell; and FIGURE 3 is a flow chart for the method of making the novel ceramic.

This invention provides a ceramic material which overcomes the above disadvantages even at elevated temperatures as high as approximately 800° F. For example, the electrical resistivity of the ceramic material constituting this invention has the order of magnitude of $1 \times 10^{13}$ ohms/(centimeter)$^2$ at an ambient temperature of approximately 70° F. The order of magnitude of the resistivity is about $10^{10}$ ohms/(cm.)$^2$ at a temperature of approximately 800° F. and is approximately $10^9$ ohms/(cm.)$^2$ at a temperature of aproximately 1000° F. The ceramic material provides a helium-leaktight seal with stainless steel and aluminum, to temperatures as high as 800° F. For example, the helium-leak rate of the ceramic material is approximately $1 \times 10^{-9}$ cubic centimeter/sec. at a temperature of approximately 800° F. The ceramic material constituting this invention is also relatively advantageous in that it has a relatively high coefficient of expansion.

The above-mentioned invention is important in facilitating the production of a seal between analuminum shell, the ceramic, ad a connection pin made of stainless steel, since, in particular, such stainless steel also has a relatively high coefficient of expansion. For example, the coefficient of expansion of the novel ceramic material is approximately 6.2. Although this coefficient of expansion is less than that of aluminum, with a coefficient of expansion in the range of 8 to 10, the coefficient of expansion of 6.2 is in the range which provides a good match with the coefficient of expansion of aluminum.

The materials forming the ceramic constituting this invention are indicated in a preferred mixture in the table below with their relative percentages by weight:

Table I

| Material: | Percentage by weight |
|---|---|
| Red lead ($Pb_3O_4$) | 77.2 |
| Boric acid ($H_3BO_3$) | 19.1 |
| Silicon dioxide ($SiO_2$) | 3.5 |
| Aluminum oxide ($Al_2O_3$) | 0.2 |

The materials indicated in Table I are thoroughly mixed and are then smelted at a suitable temperature such as approximately 1800° F. for a sufficient time to become homogenized. Since the smelting operation occurs in air and since all of the materials constitute oxides, the smelting operation can be considered to occur in an oxidizing atmosphere. After smelting, the materias indicated in Table I have the compositions and relative percentages indicated below:

Table II

| Material: | Percentage by weight |
|---|---|
| Lead oxide (PbO) | 84.0 |
| Boron oxide ($B_2O_3$) | 12.0 |
| Silicon dioxide ($SiO_2$) | 3.8 |
| Aluminum oxide ($Al_2O_3$) | 0.2 |

Although the materials indicated in Table II constitute a preferred mixture, each of the materials in the mixture may be provided with a range of percentages by weight without departing from the scope of the invention. For example, the materials may be provided with a range such as is also shown in FIGURE 1 and is indicated below:

Table III

| Material: | Approximate range of percentages |
|---|---|
| Lead oxide (PbO) | 70–90 |
| Boron oxide ($B_2O_3$) | 8–15 |
| Silicon dioxide ($SiO_2$) | 3–5 |
| Aluminum oxide ($Al_2O_3$) | 0.1–0.4 |

After smelting, the material indicated in Table II or Table III is quenched in water. Thereafter, the resulting frit, i.e., the smelted material, is wet ground, and the material is passed through a suitable screen such as a 400-mesh screen. The material can then be used as a slip for disposition in contact with stainless steel and/or aluminum to form an electrically insulating connection and bond. After passing through the 400-mesh screen, the residue can be dried and then sintered. It will be appreciated, however, that the sintering step is not required.

As an alternative, the frit can be pulverized and classified to size by passing the frit through screens with different meshes. The particles of the mixtures specified in FIGURE 1 are then mixed with a binder in a suitable ratio, such as approximately 10% or less of binder by weight to approximately 90% by weight, or correspondingly in weight of the mixture specified in FIGURE 1. By way of illustration, a polyvinyl may be ground and dried for use as the binder. As another example, a stearic acid heated to a melting temperature may also be used as the binder.

Wax may be added as a binder to the dried material or to serve as a bonding agent for holding together the particles. The wax may be one of a number of different agents, such as polyvinyl alcohol or any of the petroleum waxes, and may have a suitable percentage such as approximately one-half of one percent (0.5%) of the smelted material. The wax material can be processed into beads or some other form which is desired, and which is suitable for a hermetic seal or for a feed-through bead where it is desired to pass an electrical connection in an electrically insulating manner through a shield of metal or some other material. This connection must be insulatingly as well as hermetically supported in the opening through which the electrical connection is passed.

As shown in FIGURE 2, the ceramic may serve as a connecting or bonding agent between a stainless steel pin 10 and an aluminum shell 11. This connection serves as electrical insulation as well as a hermetic seal capable of withstanding temperatures of 800° F.

The seal is completed by placing the aforementioned beads in proper place for spacing pin and shell. Thereafter, the arrangement is heated up to 950° to 1000° F. to mature for about 20 minnutes.

During this heat treatment: (1) the hermetic seal is being formed by bonding action; (2) the ceramic material attains its final composition; and (3) the binder is removed.

The various materials capable of being used in forming ceramics may be generally divided as follows into three groups or categories:

Glass modifiers:
    Lithium oxide ($Li_2O$)
    Solium oxide ($Na_2O$)
    Potassium oxide ($K_2O$)
    Lead oxide (PbO)
    Zinc oxide (ZnO)
    Strontium oxide (SrO)
    Barium oxide (BaO)
    Calcium oxide (CaO)
    Magnesium oxide (MgO)
Glass formers:
    Arsenic oxide ($As_2O_3$)
    Boron oxide ($B_2O_3$)
    Bismuth oxide ($Bi_2O_3$)
    Aluminum oxide ($Al_2O_3$)
    Lanthanum oxide ($La_2O_3$)
Glass acid:
    Silicon dioxide ($SiO_2$)
    Cerium dioxide ($CeO_2$)
    Zirconium dioxide ($ZrO_2$)
    Titanium dioxide ($TiO_2$)
    Molybdenum trioxide ($MoO_3$)

It will be appreciated that the listing of some of the materials may be considered as somewhat arbitrary since these materials may be considered by some people as belonging in a different one of the lists than set forth above. However, the listing of the materials as set forth above will be considered as proper by many of the experts in the art. It will also be appreciated that other materials may also be included in each of the different categories. For example, the oxides of copper and silver may be included in the first category designated as the glass modifiers. These additional materials have not been included because they have low electrical resistivities and because at least some of these materials will even act as electrical conductors in colloidal solutions.

The glass modifiers may in general be considered as having alkaline properties and the properties of a base. The glass modifiers may be further considered as having a chemical formula which may be designated as $R_2O$ or RO, where R indicates the element forming the compound with the oxygen (O). The alkalinity of the element in combination with oxygen in the glass forming category or group tends to decrease progressively down the list, as does the reactivity of the compound with an acid. The electrical resistivity of the material at any particular temperature tends to increase progressively down the list. The melting temperature of the compounds in the glass modifiers tends to increase progressively down the list. No definite pattern as to the thermal coefficient of expansion of the oxides in the first category occurs with progressive listings in this category.

The third category or group may be considered as glasses and as having acidic properties. The chemical formula of these glasses may be expressed as $RO_2$ or $RO_3$, where R is the element forming the glass compound with the oxygen. The melting temperatures of the different oxides included in the third category or group tend to increase progressively down the list although the melting temperature of all of the oxides in the third category are relatively high. The reactivity of the different oxides in the third category with acids tends to increase progressively down the list. No definite pattern as to the thermal coefficient of expansion of the oxides in the third category occurs with progessive listsings in the category.

The second category or group of compounds may be designated as glass formers in that the compounds in the second category tend to react with the compounds in the third category to form the ceramic materials. The compounds in the second category or group may be designated by the chemical formula $R_2O_3$, where R indicates the element forming the compound with the oxygen. The glass formers are intermediate in chemical and physical properties to the glass modifiers and to the glasses. For example, the glass formers may react chemically with either acidic or alkaline materials. The acid resistivity of the different oxides in the second category tends to increase progressively down the list, as does the melting temperature of the different oxides in this category. No definite pattern tends to exist as to the thermal coefficient of expansion of the different oxides listed progressively in the second category.

The ceramic constituting this invention are formed by combining materials from each of the three categories set forth above. The particular materials used and the properties of such materials are dependent upon the characteristics desired for the ceramics such as glass to be produced from the material. For example, such characteristics as the melting temperature of the ceramic, the acid resistance of the ceramic, the thermal coefficient of expansion of the ceramic for different temperatures and the electrical resistivity of the ceramic at different temperatures may be controlled by varying the particular materials used and by varying the proportions of such materials. Although the ceramics constituting this invention may be used as glasses, they can be also used as coatings or glazes and designated as "enamels."

Each of the materials included in FIGURE 1 and Table III contributes to the desirable properties of the ceramic material constituting this invention. For example, the lead oxidize constitutes one of the basic materials in the glass and combines with the oxides of silcon and boron to form the glass. The oxide of silicon helps to satisfy the reaction in producing a complete chemical reaction of the different oxides in the mixture. Also, the silicon dioxide decreases somewhat the thermal coefficient of expansion. The oxide of boron facilitates smelting and glass forming. The aluminum oxide tends to slow the rate at which the ceramic material remelts, if the temperature should be raised to the temperature at which the ceramic material constituting this invention melts. For the ceramic material constituting this invention, the melting temperature is in the order of 950° F. to 1000° F.

By including the oxide of aluminum, the stiffness and viscosity of the ceramic material become enhanced. This is desirable in producing a hermetic or vacuum seal with a metallic member such as an electrical terminal.

As previously described, a ceramic having an enhanced viscosity is desirable in obtaining a hermetic or vacuum seal with respect to a metallic member such as an electrical terminal, especially when the electrical terminal has a relatively small diameter. The oxide of aluminum also tends to reduce the solubility in water of the ceramic material constituting the invention, and it tends to provide acid resistivity of the novel ceramic.

Aluminum oxide has been included in the ratio of approximately one (1) part by weight of aluminum oxide to approximately thirteen (13) parts by weight of silicon dioxide. The aluminum and silicon have been preferably included in this ratio because a eutectic point has occurred when the aluminum and silicon have been mixed in the proper proportions of 1:13. The eutectic point has caused the melting point of the mixture of aluminum and silicon to be reduced considerably below the melting point of either aluminum or silicon alone.

As may be seen from Figure 117 of "Phase Diagram for Ceramists," published by the American Ceramic Society in 1956, the melting point of the mixture of aluminum and silicon in the ratio of approximately 1:13 reduces the smelting temperature used. A reduced melting temperature of the mixture of aluminum and silicon is desirable because the fusion between the two elements becomes considerably enhanced at the reduced temperatures.

The fact that oxide of aluminum as a glass former tends to make the ceramic material relatively stiff is advantageous because it thereby extends the range of temperatures at which the ceramic material serves as a barrier against the flow of gas molecules of extraneous members through the ceramic material. The oxide of aluminum also tends to inhibit somewhat the rate at which the flux melts at its melting temperature. This is desirable if the temperature of the flux should be raised inadvertently to the melting temperature after it has been formed. Also, the enhanced viscosity of the novel ceramic is desirable characteristic in providing the ceramic with properties of serving as a barrier preventing the flow of gas molecules of extraneous members through the ceramic material.

The oxide of arsenic ($AS_2O_3$) may be included as a substitute for the oxide of boron ($B_2O_3$) to increase the melting temperature and to increase the thermal coefficient of expansion of the ceramic material constituting this invention. However, it should be appreciated that the resultant material may have a melting temperature too high to bond to aluminum but still sufficiently low to bond to other materials such as copper. Arsenic oxide ($As_2O_5$) or arsenous acid ($AsH_3O$) may also be used in place of arsenous oxide.

The oxide of arsenic and bismuth may be included as a substitute for the boron oxide in the mixture. The oxide of bismuth ($Bi_2O_3$) provides the ceramic material constituting this invention with properties of retaining its optimum properties even when subjected to nuclear bombardment. This results from the fact that the oxide of bismuth has a low tendency to capture thermoneutrons, especially in comparison with the oxide of boron, which is used here primarily for making ceramic materials. However, the resultant material may have a melting temperature too high to bond to aluminum but still sufficiently low to bond to other materials such as copper. The other oxides included in the formation of the ceramic material constituting this invention also have a low tendency to capture thermoneutrons, especially in the proportions in which the compounds are included in the ceramic material. In this way, the ceramic material constituting this invention does not tend to deteriorate as to such properties as heat insulation and as to the properties of providing mechanical and chemical barriers when exposed to thermoneuclear bombardment. The ceramic constituting this invention, accordingly, is an advantageous material when the bonds made with it are subjected to such thermonuclear bombardment.

Although the invention has been discussed above in connection with its properties of bonding a caramic to aluminum and to another material, such as stainless steel, to provide a hermetic seal, it should be appreciated that it can also be bonded to other metals such as copper or alloys, such as that designated by the trademark "Constantan" and having a composition of 45% to 60% copper, 40% to 55% nickel, and 0.0% to 1.4% manganese and suitable for use as thermocouples. It should also be appreciated that the ceramic material constituting this invention does not necessarily have to include the oxide of aluminum as one of the oxides in the ceramic material, but the elimination of the oxide of aluminum tends to increase the melting temperature of the ceramic material above the melting temperature of aluminum.

The invention is not limited to the specific embodiment outlined above, but all changes, modifications, and substitutions of equivalents not constituting departures from the spirit and scope of the invention are intended to be covered by the following claims.

What is claimed is:
1. As an article of manufacture:
a stainless steel member having a first surface;
an aluminum member having a second surface; and
a ceramic bonding said first surface to said second surface and consisting of about 12% by weight of an oxide of an element from a group consisting of boron, arsenic and bismuth, about 3.8% by weight of silicon dioxide, approximately 0.2% by weight of aluminum oxide, the remainder being lead oxide, said ceramic body having properties of providing an electrical insulation of at least $10^9$ ohms/(centimeter)$^2$ to temperatures of approximately 800° F. and of providing a hermetic seal of at least $10^{-9}$ cubic centimeters/second with the first and second surfaces to temperatures of approximately 800° F.

2. As an article of manufacture:
a stainless steel pin having a first surface;
an aluminum shell having a second surface; and
a ceramic bonding said pin to said shell and consisting only of about 12% by weight of boron oxide, about 3.8% by weight of silicon dioxide, approximately 0.2% by weight of aluminum oxide, the remainder being lead oxide, said ceramic body having properties of providing an electrical insulation of at least $10^9$ ohms/(centimeter)$^2$ to temperatures of approximately 800° F. and of providing a hermetic seal of at least $10^{-9}$ cubic centimeters/second with the first and second surfaces to temperatures of approximately 800° F.

3. A ceramic consisting only of:
about 12% by weight of oxides of bismuth and arsenic, about 4% by weight of silicon dioxide, approximately 0.2% by weight aluminum oxide, the remainder being lead oxide, said ceramic body having properties of providing an electrical insulation of at least $10^9$ ohms/(centimeter)$^2$ to temperatures of approximately 800° F. and of providing a hermetic seal of at least $10^{-9}$ cubic centimeters/second to temperatures of approximately 800° F.

References Cited
UNITED STATES PATENTS

| | | | |
|---|---|---|---|
| 2,461,878 | 2/1949 | Christensen et al. | 106—49 |
| 3,211,826 | 10/1965 | Holcomb et al. | 106—49 |
| 3,222,219 | 12/1965 | Saunders et al. | 106—49 |
| 3,291,586 | 12/1966 | Chapman et al. | 106—49 |

JAMES E. POER, Primary Examiner

U.S. Cl. X.R.

106—54; 174—151; 252—63.5